United States Patent [19]
Key et al.

[11] Patent Number: 6,084,955
[45] Date of Patent: *Jul. 4, 2000

[54] COMMUNICATION NETWORK CONTROL METHOD AND APPARATUS

[75] Inventors: Peter Bernard Key, Woodbridge; Thomas Rhodri Griffiths, Hanwell; Francis Patrick Kelly; Richard John Gibbens, both of Cambridge, all of United Kingdom

[73] Assignee: British Telecommunications plc, London, United Kingdom

[*] Notice: This patent is subject to a terminal disclaimer.

[21] Appl. No.: 08/999,881

[22] Filed: Oct. 11, 1996

Related U.S. Application Data

[63] Continuation of application No. PCT/GB95/00823, Apr. 11, 1995, which is a continuation-in-part of application No. 08/252,097, May 31, 1994, Pat. No. 5,521,971.

[30] Foreign Application Priority Data

Apr. 13, 1994 [EP] European Pat. Off. .......... 9430261905

[51] Int. Cl.$^7$ .......................... H04M 7/00; H04M 15/00; H04J 1/16; H04J 3/14

[52] U.S. Cl. .......................... 379/220; 370/233; 379/133; 379/137; 379/197

[58] Field of Search .................................. 370/229, 230, 370/231, 232, 233, 234, 252, 349, 395; 379/111, 112, 113, 114, 115, 133, 137, 196, 197, 198, 219, 220, 221

[56] References Cited

U.S. PATENT DOCUMENTS 4,979,168  12/1990  Courtois et al. .......................... 370/349
5,357,507  10/1994  Hughes et al. .......................... 370/234

FOREIGN PATENT DOCUMENTS 0 433 699  6/1991  European Pat. Off. .

OTHER PUBLICATIONS

Globecom '91. vol. 1 OF 3, Dec. 1991 Phoenix, pp. 331–338, XP 000325994 R. Bolla et al 'Adaptive Access Control of Multiple Traffic Classes in ATM Networks.' 325994' p. 331, right column, line 40 p. 332, left column, line 25.

IEEE Transactions on Information Theory, vol. 38, No. 1, Jan. 1992 New York, pp. 177–182, XP 000246277 Y. Liu et al 'Optimality of the Sequential Probability Ratio Test for Nonstationary Observations'pp. 178–179.

IEEE Infocom'92 vol. 1 of 3, May 1992 Florence, pp. 95–104, XP 000300050 P.Skelly et al. 'A Histogram–based Model for Video Traffic Behavior in an ATM Network Node with an Application to Congestion Control' p. 98, right column, line 37–p. 100. right column, line 7.

IEEE Journal on Selected Areas in Communications, vol. 9, No. 7, Sept. 1991 New York, pp. 968–981, XP000272772 R. Guerin et al. 'quivalent Capacity and Its Application to Bandwidth Allocation in High–Speed Networks.' p. 970, left column, line 1–line 29.

*Primary Examiner*—Harry S. Hong
*Attorney, Agent, or Firm*—Nixon & Vanderhye, P.C.

[57] ABSTRACT

A communication network includes a number of network nodes linked together by transmission paths. A network manager controls acceptance of calls onto transmission paths by classifying an incoming call and selecting from the database an appropriate mean to peak bit rate distribution. This selected distribution is then used with the monitored transmission path load to determine a posterior distribution which reflects the load. The decision to accept or reject the call is made on the basis of the posterior distribution by a call acceptance algorithm considering the effective bandwidth for example.

6 Claims, 4 Drawing Sheets

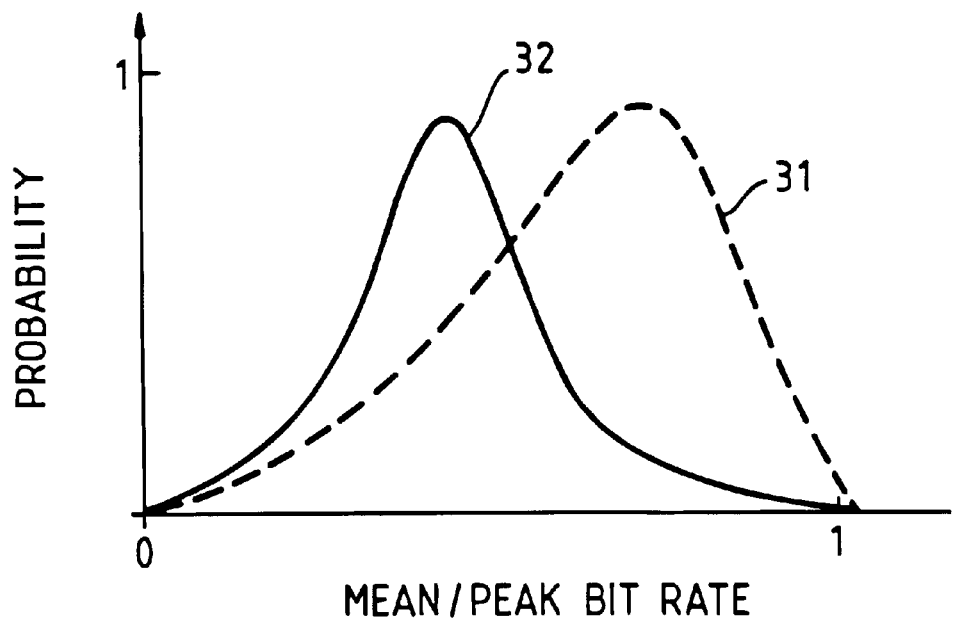

COMMUNICATION NETWORK CONTROL METHOD AND APPARATUS

CROSS-REFERENCE TO RELATED APPLICATION

This application is a continuation (under 35 USC §120/365) of copending PCT/GB95/00823 filed Apr. 11, 1995 designating the U.S. and filed as, in turn, a continuation-in-part (under 35 USC §120/365) of U.S. application 08/252,097 filed May 31, 1994 now USP 5,521,971 granted 28 May 1996.

BACKGROUND OF THE INVENTION

1. Field of the Invention

This invention relates to a communication network control method and apparatus.

2. Related Art

In order to maintain the quality of service in communication networks, it is necessary to limit the number of calls allowed onto the network. The optimum number of calls to be allowed on the network is determined by the characteristics of the network which depend on trunk speeds and other hardware constraints, such as buffer sizes. The mix of call types and the relative number of each is also an important consideration.

Where a user of a network knows the mean bit rate of the call he wishes to place on the network, it is possible to use methods which employ Convolution or Large Deviation Approximation techniques to determine whether the call can be carried by the network without the quality of service dropping below a minimum value. However, in practice the user is unlikely to know what the call's mean bit rate will be. This will be especially the case where the network carries broadband services. It has been proposed to monitor the network's traffic load and to refine the control method in a dynamic way. This type of method has been called dynamic Connection Admission Control (CAC).

Given the uncertainties surrounding the data type that will be carried on communication networks offering broadband services, there is a generally held belief in the communications field that it will not be possible to employ statistical multiplexing techniques on networks that employ asynchronous transfer mode techniques (ATM).

SUMMARY OF THE INVENTION

The present invention arose from a realisation by the inventor that whilst a resource trying to make a connection with the network would be unlikely to know its mean bit rate, it would undoubtedly have knowledge about its peak bit rate.

According to the invention there is provided a communication network control method for controlling acceptance of a call from a first network node to a second network node over a transmission path between the nodes comprising providing a database of activity distributions for particular classes of calls, classifying the call, selecting from the database a distribution appropriate to the call, determining a current load on the transmission path due to calls of that class, deriving a posterior activity distribution from the selected distribution and current load, and rejecting or accepting the call on the basis of the posterior activity distribution.

By providing a database of activity distributions for particular classes of calls and generating, from this, and a measure of the current load due to calls of that class, a posterior activity distribution, a much better estimate of the activity can be obtained.

An activity distribution could be a variance distribution or various forms of bit rate distribution. It can be thought of as the likelihood or probability of a certain call load being attained by a particular class of call. Preferably, the activity distribution is a mean to peak bit rate distribution.

The posterior distribution will then be used by a call acceptance control algorithm to determine whether the call can be accepted onto the network. The preferred way of doing this is to determine the effective bandwidth of the current load on the transmission path from the posterior distribution. From the effective bandwidth, the quality of service if the call is accepted will be determined and compared with a required quality of service. If the quality of service is maintained then the call is accepted, if not, the call is rejected for that transmission path.

Preferably, the posterior distribution is generated by a Bayesian analysis of the selected distribution and the current load.

Preferably, the call is classified according to a parameter declared by the call. In a preferred embodiment the parameter is the peak bit rate of the call. Other parameters that may be used are much as whether its a particular type of call for example video or using a particular type of equipment.

In some networks, certain classes of calls may be allocated certain bandwidth out of the total transmission path bandwidth. However, in the other networks there will not be any collective bandwidth allocation. Whilst in the former form of network it will be possible to compare the posterior distribution for the call class with the allocated bandwidth for that class and use this as the basis for whether or not the call is accepted, in the latter type of network, preferably, the load on the transmission path due for all call classes is periodically monitored and a measure of the monitored load is stored. The call is then accepted on the basis of the stored monitored load and the posterior distribution by, for example determining the effective bandwidth of the stored load and posterior distribution and comparing this with the capacity of the transmission path to ensure that the required quality of service is maintained.

The advantage of periodically monitoring the load on the transmission path over producing, for example, a posterior distribution for each call class, upon a request being received to allow a call of a particular class onto the transmission path, is that of speed in reaching the decision whether to accept or reject the call.

According to a second aspect of the invention there is provided apparatus for controlling acceptance of a call from a first network node to a second network node over a transmission path between the nodes comprising: memory for, in use, holding a database of activity distributions for particular classes of calls; means for classifying the call; means for selecting from the database a distribution appropriate to that class; means for determining a current load on the transmission path due to calls of that class; means for generating a posterior activity distribution from the selected distribution and current load; and means to reject or accept the call on the basis of the posterior distribution.

BRIEF DESCRIPTION OF THE DRAWING

A specific embodiment of the invention will now be described, by way of example only, with reference to the drawings in which:

FIG. 2 is an explanatory diagram;

FIG. 3 is a table data structure used in the communication network shown in FIG. 1;

DETAILED DESCRIPTION OF EXEMPLARY EMBODIMENTS

Figure 1:
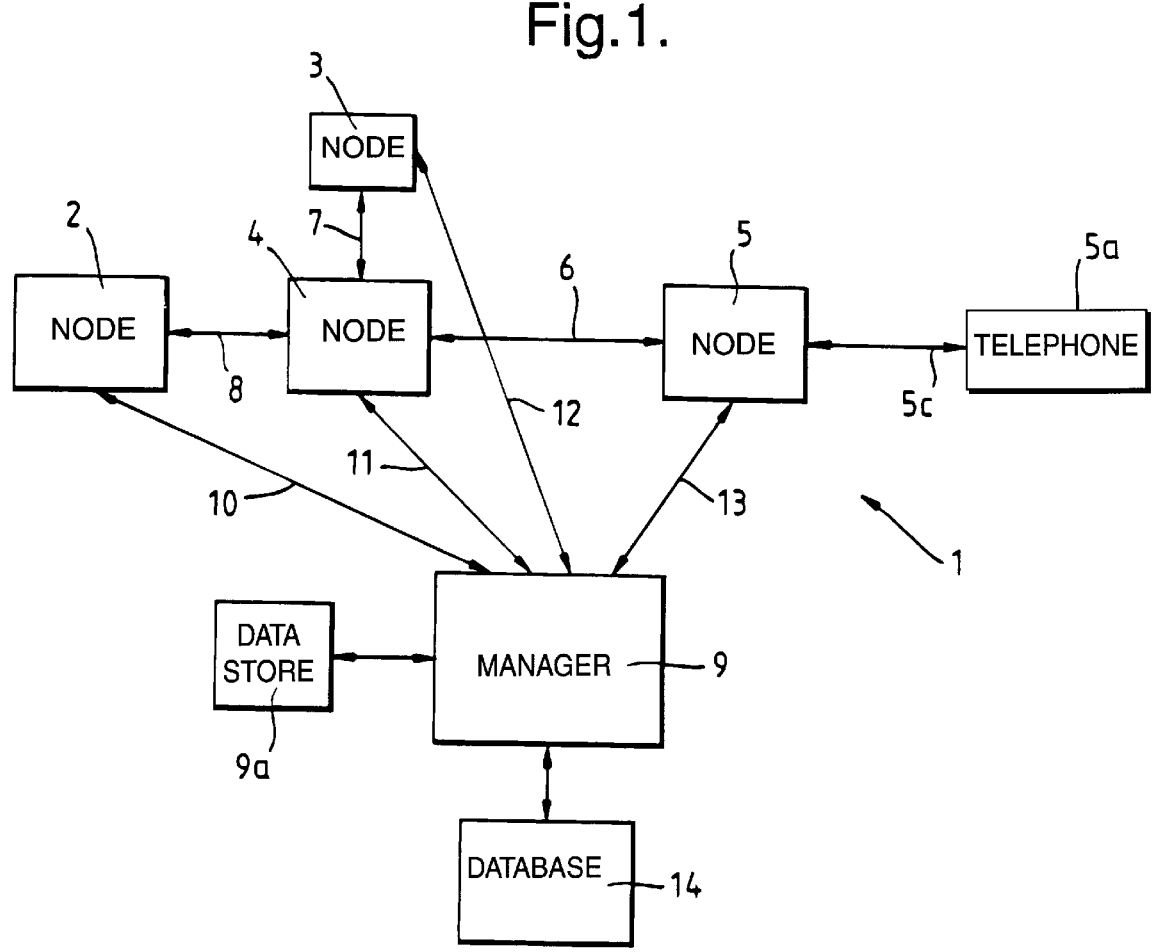
FIG. 1 shows a communication network, being controlled by a method in accordance with the invention.

With reference to FIG. 1, a communication network 1 comprises a plurality of nodes 2,3,4 and 5 interlinked by transmission paths 6, 7 and 8. The precise nature of the nodes and transmission paths will depend on the network and they may be, for example, multiplexers, switches and optical fibre. The operation of the network is governed by a network manager 9 which may itself be a node (or distributed over a number of nodes) comprising a computer terminal of known type such as a Sun Microcomputer, marketed by the Sun Corporation which monitors, communicates with, and controls the nodes 2, 3, 4 and 5 along control data paths 10, 11, 12 and 13 of known type. The network manager has a historical database 14 containing data about mean to peak bit rate distributions of call types having particular declared peak bit rate and a measured load datastore 9a. A telephone 5a is served by node 5 via a transmission path 5c.

Two typical mean to peak bit rate distributions are shown in FIG. 2. The distributions can be thought of as a measure of the activity of a call in the sense of the likelihood of the call having a particular mean to peak bit rate. It will be seen that distribution 31 is the distribution for a call class or type having a greater activity than that of distribution 32. This is because its most probable mean to peak bit rate, the peak of distribution 31, is closer to unity than that of distribution 32.

In practice, a large number of prior distributions will be held on the database 14 in the form of a table 41 having a data-structure, as is illustrated in FIG. 3. The table 41 comprises two fields, a first data field 42 called PEAK and a second data field 43 called DISTRIBUTION.

The PEAK field 42 contains ranges of possible peak bit rate values which will be declared by a node when a request is made to place a call on the network.

DISTRIBUTION field 43 will contain parameterised versions of the distribution curves appropriate to each range of peak bit rates stored in the PEAK field 42.

The network managers 9 operates to control the network 1 in a manner which will now be described.

Figure 4:
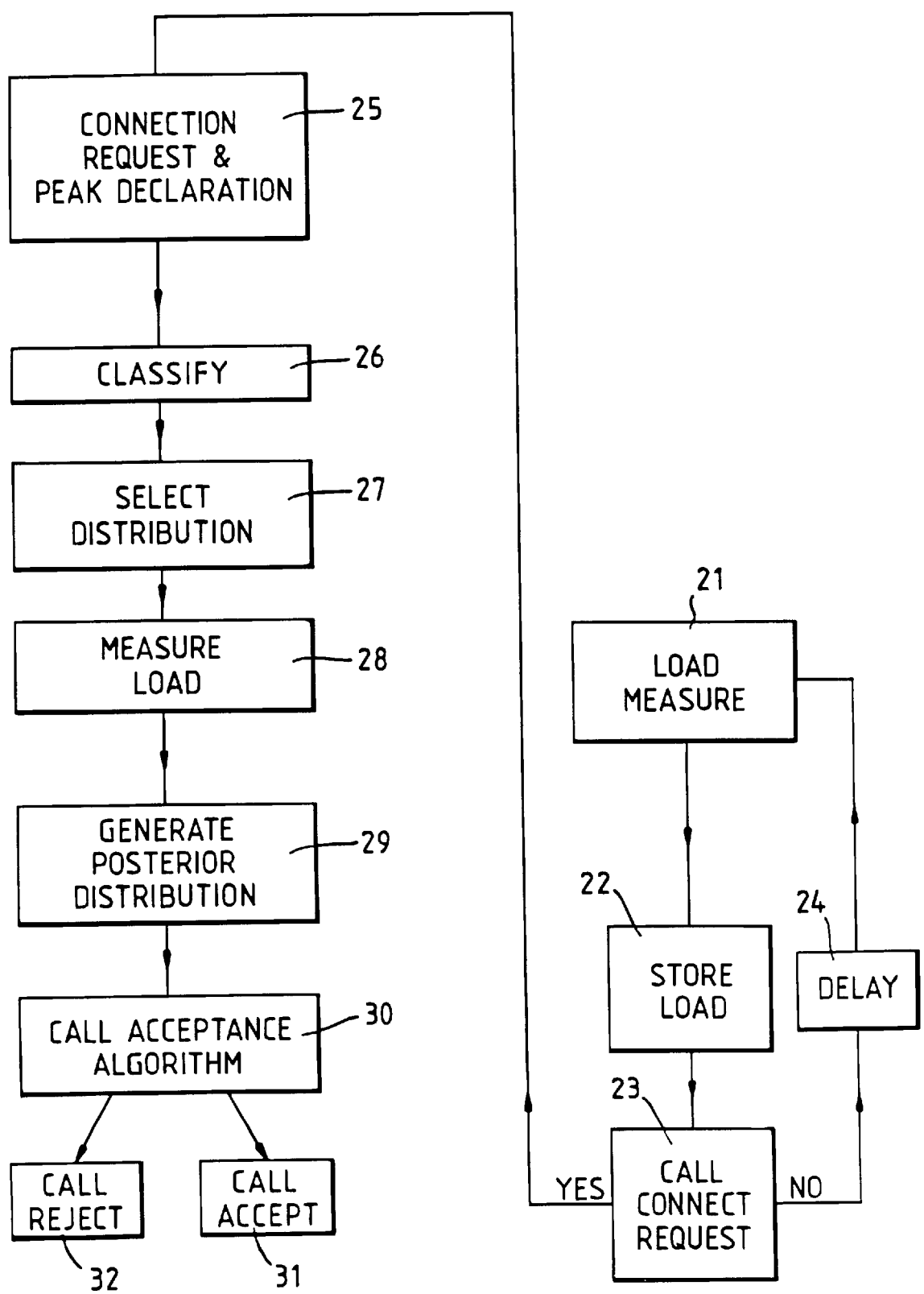
FIG. 4 is a flow chart of the method used to control the network shown in FIG. 1.

Consider the network 1 as it operates under the following conditions. Node 4 is communicating with node 3 and node 2. The call traffic is a mixture of call types such as constant bit rate and variable bit rate voice and video data. The network manager periodically measures the load on the transmission path due to the call classes, as represented by box 21 in the flow chart shown in FIG. 4. The determined load is stored in datastore 9a, as represented by box 22. The network manager 9 then monitors the network for a call connect request box 23. If a call connect request is not received after a time delay, as represented by box 24, the load is measured again as represented by box 21.

Node 5, not at present transmitting data to other nodes, wishes to do so and requests the network manager 9 to allow connection to node 4. This is represented by box 25 of the flow chart shown in FIG. 4. When requesting connection, node 5 declares its peak bit rate which is determined by the type of equipment of which the node 5 is comprised and will thus be "known" to the node.

The declared peak is then compared with the value ranges stored in the historical database 14, this in effect classifying the call, as represented by box 26, and an appropriate historical mean to peak bit rate distribution is selected, as represented by box 27.

The network manager 9, measures the network load as represented by box 28 but in this case it is the load far the class of the call which wishes to be accepted. In particular, it monitors the load on a transmission path between the transmitting and receiving nodes, in this case path 6.

The measured load and the selected distribution are then used by the network manager 9 to generate a posterior distribution, as represented by box 29. The preferred way of generating the posterior distribution is by a Bayesian analysis and it is a distribution of mean to peak bit rate against probability as earlier described, but reflecting the predicted behaviour of the current call load for a particular class.

The network manager 9 then uses the posterior distribution in a call acceptance algorithm, as represented by box 30, to determine whether the call is to be accepted, as represented by box 31, or rejected, as represented by box 32.

The preferred method for determining whether or not to accept the call onto the transmission path is by determining the effective bandwidth of the present call load as will now be described.

The transmission path 6 has a capacity C and supports a number of calls separated into I different classes. The calls in each class share the same characteristics. If the effective bandwidth of a call in the j th class is aj and there are nj, such calls then the quality of service is maintained only if:

$$C \geq \sum_{j=1}^{I} aj \cdot nj$$

Thus, if the network manager 9 derives from the posterior distribution an estimate of the mean bit rate of the load on the transmission path 6. The estimated mean bit rate is then used with the peak bit rate for that class of call to calculate the effective bandwidth in the following manner.

If in the Bayesian analysis, the peak bit rate of the call is normalised to 1 and the prior distribution $\pi(p)$ represents the original belief of the activity (p) of a call defined as the mean bit rate to peak bit rate ratio.

If the load generated by the n calls (of this type) currently carried by the link is represented by $S_n$ and in the measurement period is s.

If $P(S_n=s|p)$ is the probability of the load $S_n$ being s in the last measurement period, conditional on the activity of an individual call being p.

The posterior distribution $\pi(p|S_n=s)$ for the activity is then given by, $$\pi(p|S_n = s) = \frac{\pi(p)P(S_n = s|p)}{\int_0^1 \pi(p)P(S_n = s|p)dp}$$

The cell loss probability L is defined as, $$L = \frac{\text{Expected number of cells lost}}{\text{Expected number of cells sent}}$$

The estimate for the cell loss probability $\hat{L}(n,s)$, from n calls, supported by a resource of capacity C is given by, $$\hat{L}(n, s) = \frac{E[S_n(t) - C|S_n(0) = s]}{nE[X(t)|S_n(0) = s]}$$

Where $S_n(0)$ represents the monitored load used to obtain the posterior distribution, $S_n(t)$ the load from all calls of this type at time t and X(t) the load produced by an individual call at time t.

This can be expressed as:

$$\hat{L}(n, s) = \frac{\int_0^1 \sum_{m=1}^{n-c} P\{S_n(t) \geq C + m|p\}\pi(p|S_n(0) = s)dp}{n\int_0^1 p\pi(p|S_n(0) = s)dp}$$

If the maximum permissible cell loss is $L_{max}$, the maximum number of calls of this type which can be multiplexed $n_{max}$ must therefore obey, $$L_{max} \geq \hat{L}(n, s) = \frac{\int_0^1 \sum_{m=1}^{n_{max}-c} P\{S_{nmax}(t) \geq C + m|p\}\pi(p|S_n(0) = s)dp}{n\int_0^1 p\pi(p|S_n(0) = s)dp}$$

This can be evaluated using the effective approximation, $$P[S_{nmax}(t) \geq C | p] \approx \exp\left\{-n_{max}\left(\frac{c}{n_{max}}\ln\frac{c}{n_{max}p} - \left(1 + \frac{c}{n_{max}}\right)\ln\left(\frac{1 - \frac{c}{n_{max}}}{1 - p}\right)\right)\right\}$$

From $n_{n\ max}$ the effective bandwidth α for the call is obtained by using, $$\alpha = \frac{c}{n_{max}}$$

This effective bandwidth is added to the effective bandwidth of the stored network load retrieved from database 9a by the network manager 9. The total effective bandwidth is then compared with the capacity of the transmission path 6 and if the required quality of service is maintained then the call is allowed onto the transmission path 6.

If the required quality of service is not maintained, then an alternative transmission path is selected and considered as before.

In alternative embodiments, the load on the transmission path may be determined by providing a database storing tables of effective bandwidth for particular classes of calls for particular loads and numbers of calls. The network manager will then obtain the effective bandwidth by inputting the number of calls of the various classes on the transmission path in question.

The provision of load values as a table structure will reduce the amount of processing time required since the values are not generated on-line. This will result in the need for a larger memory capacity than would be necessary if the values were generated on-line.

Figure 5:
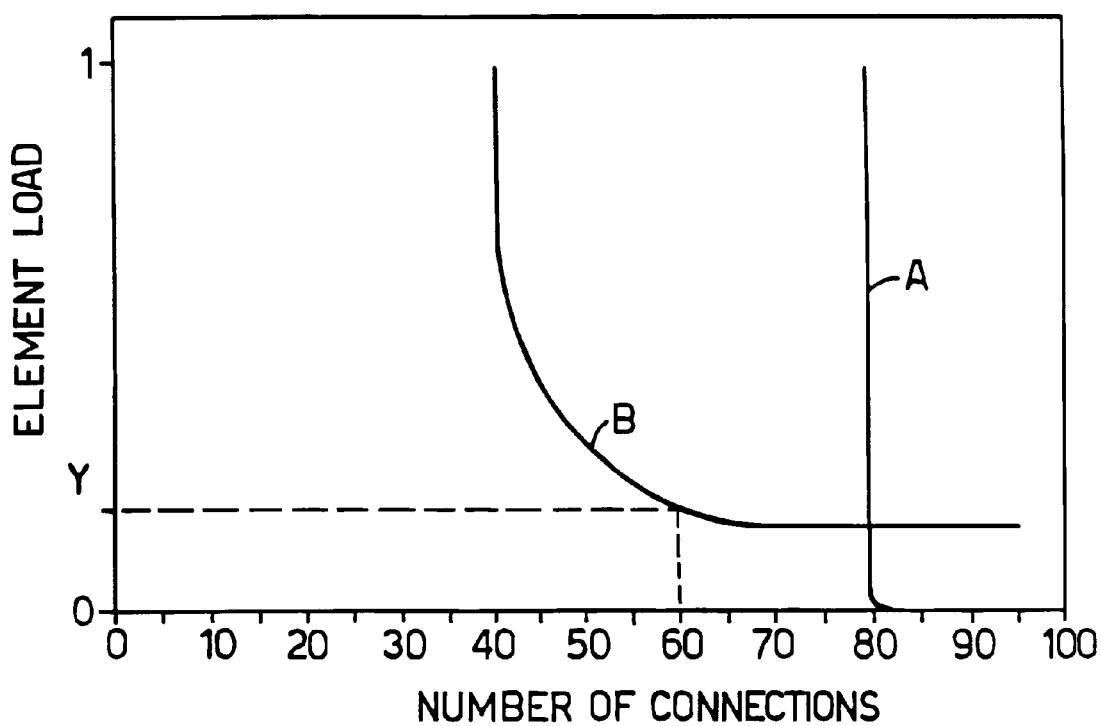
FIG. 5 is an explanatory diagram.

In effect, an acceptance boundary is utilised which may be represented by a curve on a graph of element load against number of connections for a particular class of call as shown in FIG. 5. Curve A represents the situation where exact prior information is known about the mean bit rates of equipment attempting to establish connections to the network. Curve B represents the situation where the information is only vague. It can be seen that where the exact prior information is known only eighty calls are accepted to a node. Where less information is known as the element load increases (goes to unity) only a small number of calls (forty) are accepted. As the measure load decreases the algorithm allows more calls to be accepted since the calls generate less traffic.

Curve B can be held as a function or as a set of parameterised values in a lock-up table. Thus a value of the current element load can be input into the table and an allowed number of connections output from the table. If this number of connections is not exceeded then a further call can be accepted onto the network.

For example, if the current element load is Y then sixty connections can be allowed onto that element.

The prior distributions held in the historical database may, in some embodiments, be updated by the network manager from the monitored load.

If the call is rejected for a particular transmission path, the network manager may find an alternative route for the call in a manner well known to those skilled in the art. The new route will then be tested in the same way by generating a posterior distribution from the selected historical distribution and the new transmission path's load.

What is claimed is:

1. Apparatus for controlling acceptance of a call from a first network node to a second network node over a transmission path between the nodes, said apparatus comprising:

memory for holding a database of activity distributions for particular classes of calls;

means for classifying the call;

means for selecting from the database a distribution appropriate to that class;

means for determining a current load on the transmission path due to calls of that class;

means for generating a posterior activity distribution from the selected distribution and current load; and means to reject or accept the call on the basis of the posterior distribution.

2. Apparatus as in claim 1 wherein:

the activity distributions are mean to peak bit rate distributions.

3. Apparatus as in claim 1 wherein:

the means for generating a posterior activity distribution includes means to perform a Bayesian analysis.

4. Apparatus as in claim 1 wherein:

the means for classifying a call includes a look-up table of peak-bit rates and corresponding activity distributions.

5. Apparatus as in claim 1 wherein:

the call is accepted or rejected by the means for accepting or rejecting a call (a) determining an effective bandwidth from the posterior distribution and (b) comparing the effective bandwidth with the bandwidth of the transmission path to determine whether to accept or reject the call.

6. Apparatus as in claim 1 further comprising:

means to store a required quality of service;

means for predicting a quality of service if the call is accepted; and means for comparing the predicted quality of service with the required quality of service, the call being rejected if the predicted quality of service is less than the required quality of service.

* * * * *